United States Patent [19]

Van Der Herberg

[11] Patent Number: 5,895,567

[45] Date of Patent: Apr. 20, 1999

[54] BIOLOGICAL WASTE FLUID CLEANER

[75] Inventor: Jan Wytze Van Der Herberg, Heerenveen, Netherlands

[73] Assignee: Patent Care B.V., Meppel, Netherlands

[21] Appl. No.: 08/817,652

[22] PCT Filed: Oct. 10, 1995

[86] PCT No.: PCT/NL95/00347

§ 371 Date: Jul. 8, 1997

§ 102(e) Date: Jul. 8, 1997

[87] PCT Pub. No.: WO96/11168

PCT Pub. Date: Apr. 18, 1996

[30] Foreign Application Priority Data

Oct. 10, 1994 [NL] Netherlands .................... 9401669

[51] Int. Cl.$^6$ .................... C02F 3/04; B01D 53/85
[52] U.S. Cl. .................... 210/97; 210/150; 210/194; 210/205; 210/216; 210/268; 210/618
[58] Field of Search .................... 210/97, 143, 150, 210/151, 184, 194, 197, 205, 216, 268, 618

[56] References Cited

U.S. PATENT DOCUMENTS

| | | | |
|---|---|---|---|
| 4,076,616 | 2/1978 | Verde | 210/618 |
| 4,800,021 | 1/1989 | Desbos | 210/150 |
| 5,298,164 | 3/1994 | Hapach et al. | 210/618 |
| 5,372,712 | 12/1994 | Petit | 210/151 |
| 5,494,574 | 2/1996 | Unterman et al. | 210/150 |
| 5,573,671 | 11/1996 | Klein | 210/150 |

FOREIGN PATENT DOCUMENTS

| | | |
|---|---|---|
| 399380 | 11/1990 | European Pat. Off. . |
| 428747 | 5/1991 | European Pat. Off. . |
| 2583406 | 12/1986 | France . |
| 3422045 | 12/1985 | Germany . |
| WO93/01137 | 1/1993 | WIPO . |

Primary Examiner—Thomas G. Wyse
Attorney, Agent, or Firm—Evenson, Mckeown, Edwards & Lenahan, P.L.L.C.

[57] ABSTRACT

The invention relates to an apparatus for cleaning organic waste material from waste fluid. This comprises a container at least partially filled with carrier elements, a waste fluid feed debouching into the container close to a vertical end, a fluid outlet connected to the container close to the opposite vertical end, carrier circulation means comprising a pump for pumping round water with carrier elements taken up therein, provided with a pump inlet and outlet respectively close to opposing vertical ends of the container, a sediment drain at the bottom of the container and control means for periodically switching on the carrier circulation means.

13 Claims, 8 Drawing Sheets

BIOLOGICAL WASTE FLUID CLEANER

The invention relates to an apparatus for cleaning organic waste material from waste fluid, such as known from FR-B-2583406.

The known apparatus comprises a container at least partially filled with carrier elements. Waste water is guided along these carrier elements. On the carrier elements develop micro-organisms which process the organic material in the waste water so that the water is cleaned.

With the invention an apparatus of this type is obtained which functions effectively for cleaning at leaste waste air and with which the sludge formed from the organic waste material by the micro-organisms can be efficiently removed.

In the apparatus according to the invention the cleaning action of the micro-organisms takes place while the carrier elements are at rest. This creates optimum conditions for the development and action of these micro-organisms. The formed sludge is drained periodically by setting into operation the carrier circulation means. The movement of the carrier elements caused by these means releases the excess sludge and this can be discharged via the sediment outlet. The apparatus can be dimensioned for instance such that the purifying action of the micro-organisms can take place throughout the working week, while discharge of sludge takes place by setting the carrier circulation means into operation during the weekend. During normal operation of the apparatus the carrier elements are only moistened by means of the water-sprinkling device and the air to clean can flow freely along the carrier elements. In order to discharge the formed sludge the container is filled with water by means of the water transporting means, whereafter the pump can be switched on to pump round the carrier elements to thereby dislodge the formed sludge and enable its discharge via the sediment outlet.

A further development, where the pump outlet debouches in the top of the container above a guide surface provided with apertures, below which is arranged a water collecting element connected to the sediment drain. The carrier elements are poured onto the guide surface together with the water with which they are being transported. The transporting water together with the released sludge absorbed therein flows through the apertures in the guide surface into the water collecting element and from there to the sediment outlet. The cleaned carrier elements are moved from the guide surface onto the top of the carrier elements in the container.

In another embodiment, the guide surface takes a form sloping toward an end edge. The carrier elements slide or roll, depending on their shape, over the sloping guide surface to the end edge and fall therefrom onto the carrier elements already present in the container.

In another favorable feature the carrier elements have a specific mass lower than that of water and the pump inlet debouches in the top of the container and the pump outlet in the bottom of the container. Because the pump outlet debouches in the bottom of the container, the dislodged sludge is likewise released in the bottom of the container. This dislodged sludge can settle in the bottom of the container and be drained immediately or later via the sediment outlet. The carrier elements released from the pump outlet move upward of themselves due to the buoyant force resulting from their lower specific weight.

A preferred apparatus for cleaning organic waste material from waste air and waste water comprises a container at least partially filled with carrier elements, a waste water feed debauching into the top of the container, a water outlet connected to the bottom of the container, level control means for defining an intermediate level in the container and maintaining a free water surface at the intermediate level, a waste air feed debauching close to the intermediate level in the container, an air outlet in the top of the container. The apparatus also has carrier circulation means comprising a pump for pumping round water with carrier elements taken up therein, a pump inlet and outlet respectively at the top and at the bottom of the container, and control means for periodically switching on the carrier circulation means. With this apparatus waste water and waste air can be cleaned simultaneously. The waste water cleaning by the action of the micro-organisms takes place in the lower part of the container and cleaning of the waste air in the upper part of the container.

In another preferred embodiment, the carrier elements have a size and the container contains a quantity of carrier elements such that the carrier elements form a packed bed in the container. Because the carriers form a packed bed they do not, or practically do not, move relatively of each other. The micro-organisms can hereby develop unhindered on the carrier elements and are not rubbed off for instance by relative movements of the carrier elements.

A preferred pump for use in the invention is a centrifugal pump with retracted impeller.

The invention will be elucidated in the following description with reference to the embodiments shown in the figures.

Figure 1:
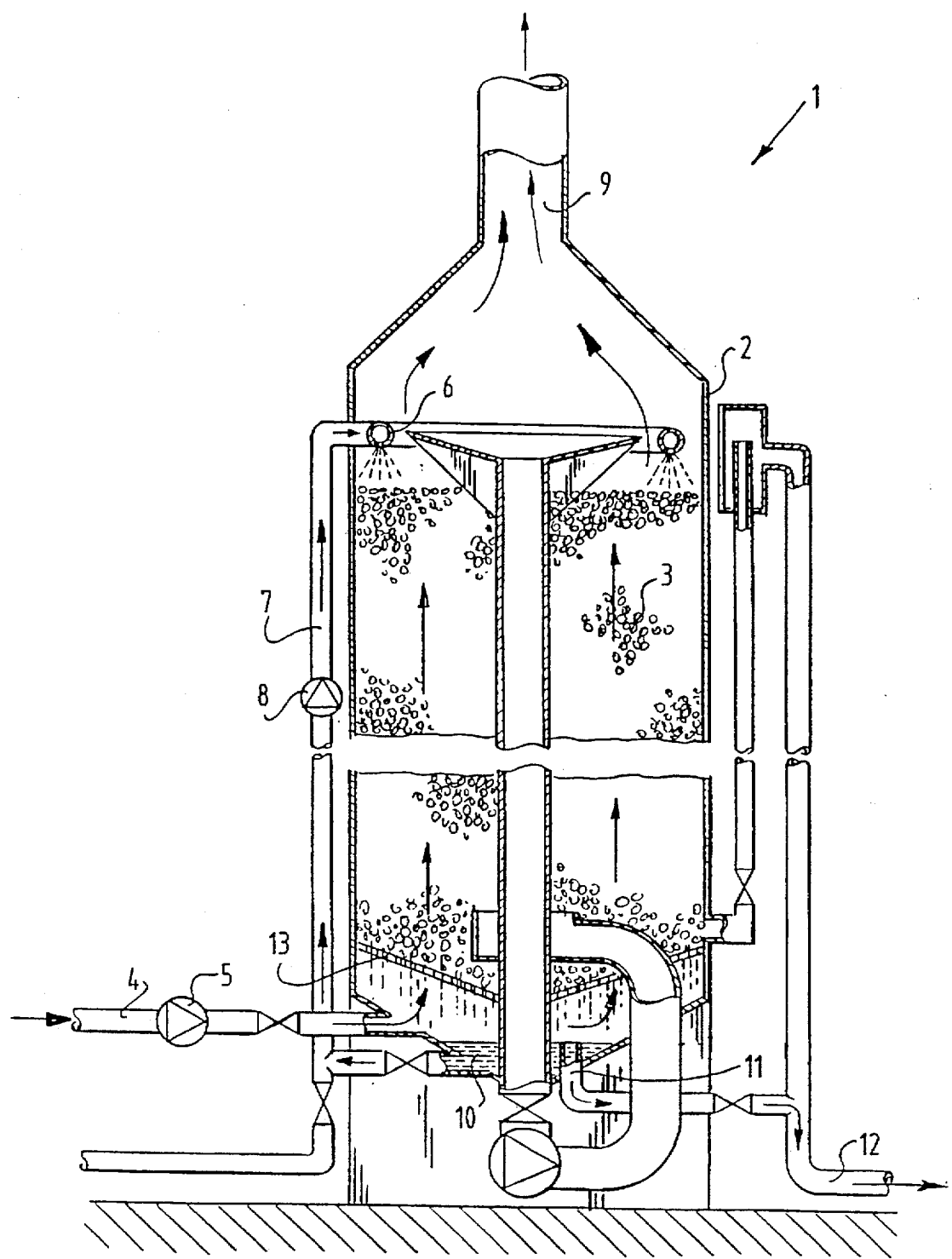
FIG. 1 shows an apparatus according to the invention for cleaning air in the operational situation.

The apparatus 1 shown in FIG. 1 is intended for cleaning organic waste material from waste air. This apparatus 1 comprises a container 2 partially filled with carrier elements 3. These latter form in container 2 a packed bed through which waste air can flow.

The waste air is supplied via the air feed 4. An air pump 5 is arranged in this air feed. Air feed 4 debouches in the bottom of container 2 so that the air flows from the bottom to the top through the packed carrier elements 3. Formed on the top side of container 2 is an air outlet 9 where the purified air leaves apparatus 1.

A water sprinkling device 6 is arranged in the upper part of container 2. The water sprinkling device 6 sprinkles water on the carrier elements 3. This water flows gradually downward through the bed of carrier elements 3 and flows via a grid 13, on which the carrier elements 3 rest, into the bottom of container 2. The water 10 collected in the bottom of container 2 can be fed back again to the sprinkler 6 via the pipe 7 in which 10 is arranged a pump 8. A possible excess quantity of water is drained to the water outlet 12 via overflow 11.

Under the conditions in which the carrier elements 3 are situated, i.e. a moist, aerated environment, micro-organisms will develop on the carrier elements which feed on organic waste material from the throughfed air. So-called sludge consisting of micro-organisms and conversion products is herein formed on the carrier elements.

The air leaving the apparatus at 9 is thus purified of the organic waste material which it originally contained.

After a period of time the sludge would grow such that the flow through the bed would be made more difficult. Before this happens the excess sludge must be removed. The manner in which this takes place is further elucidated with reference to FIG. 2.

The air feed 4 and the discharge via the overflow 11 are first closed by means of shut-off valves accommodated in the relevant pipes. As much water is then supplied via pipe 20 that the water level in container 2 rises to the top. The level of the free water surface is determined herein by the level controller 19 which is arranged in a bypass conduit connected to the discharge pipe 12. In the embodiment of the apparatus according to the invention shown here carrier elements 3 are used which have a lower specific mass than water. These carrier elements therefore float on water. Due to the upward force exerted by the water on the carrier elements 3 still immersed in the water a part of the carrier elements 3 is pushed up above the free water surface.

The apparatus 1 further comprises carrier circulation means 15 incorporating a pump 14. This pump 14 is connected to a vertical duct 16. The pump inlet 17 situated in the top of the container is provided with a funnel.

After switching on the pump 14 water with pushed up carrier elements 3 is carried downward via duct 16 to the pump 14. The stream of water with carrier elements passes through the pump 14 and is discharged again at the pump inlet 18 situated in the bottom of container 2. A suitable type of pump 14 is of course chosen, i.e. a type through which the carrier elements taken up into the water flow can pass. The pump 14 is preferably a centrifugal pump with retracted impeller.

The pump 14 has a capacity such that when the pump 14 is switched on the flow speed in the vertical duct 16 is greater than the speed at which the carrier elements 3 rise in still water. The carrier elements are hereby carried along downward in certain manner to the pump 14. During this transport of the carrier elements 3 the sludge adhering to carrier elements 3 is dislodged. Particularly during passage through the pump 14 there occur violent swirling movements which as it were wash clean the carrier elements 3.

The washed carriers and the washed-off sludge leave the pump outlet at 18. The carrier elements, which as noted are lighter than water, float upward, while the sludge is drained along with the water through the bypass conduit to the outlet 12 and settles in the bottom of the container 2.

After the circulation means 15 have been switched on for a sufficient time, to be determined experimentally, they are switched off again. The supply of water through pipe 20 is closed and the overflow pipe 11 is re-opened. The water level hereby falls back to the level shown in FIG. 1 and the settled sludge is flushed away via overflow 11 to the outlet 12. As soon as the level shown in FIG. 1 has been reached again the sprinkler device and the air feed can be switched on again in order to clean waste air once again for a determined period.

It is suitable to dimension the apparatus 1 such that it can clean air uninterruptedly for a period corresponding with a period during which waste air for cleaning is released. In a continuous production process which is only interrupted in the weekends the capacity of the apparatus is thus preferably such that it can clean air uninterruptedly for a working week. The regeneration of the carrier elements 3 by switching on the circulation means 5 can then take place during the weekend.

Figure 2:
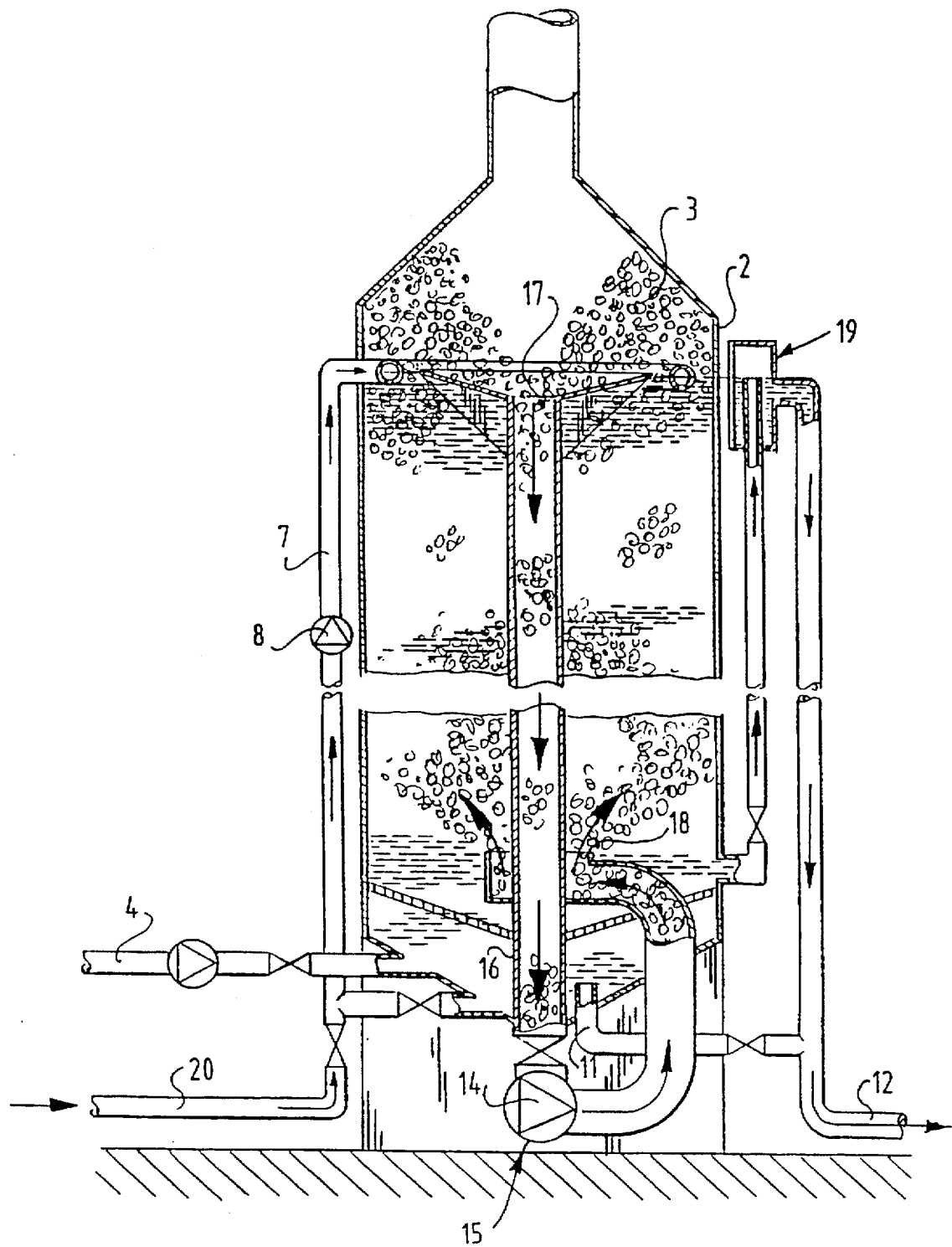
FIG. 2 shows the apparatus of FIG. 1 during regeneration, i.e. during the operation of the carrier circulation means.
Figure 3:
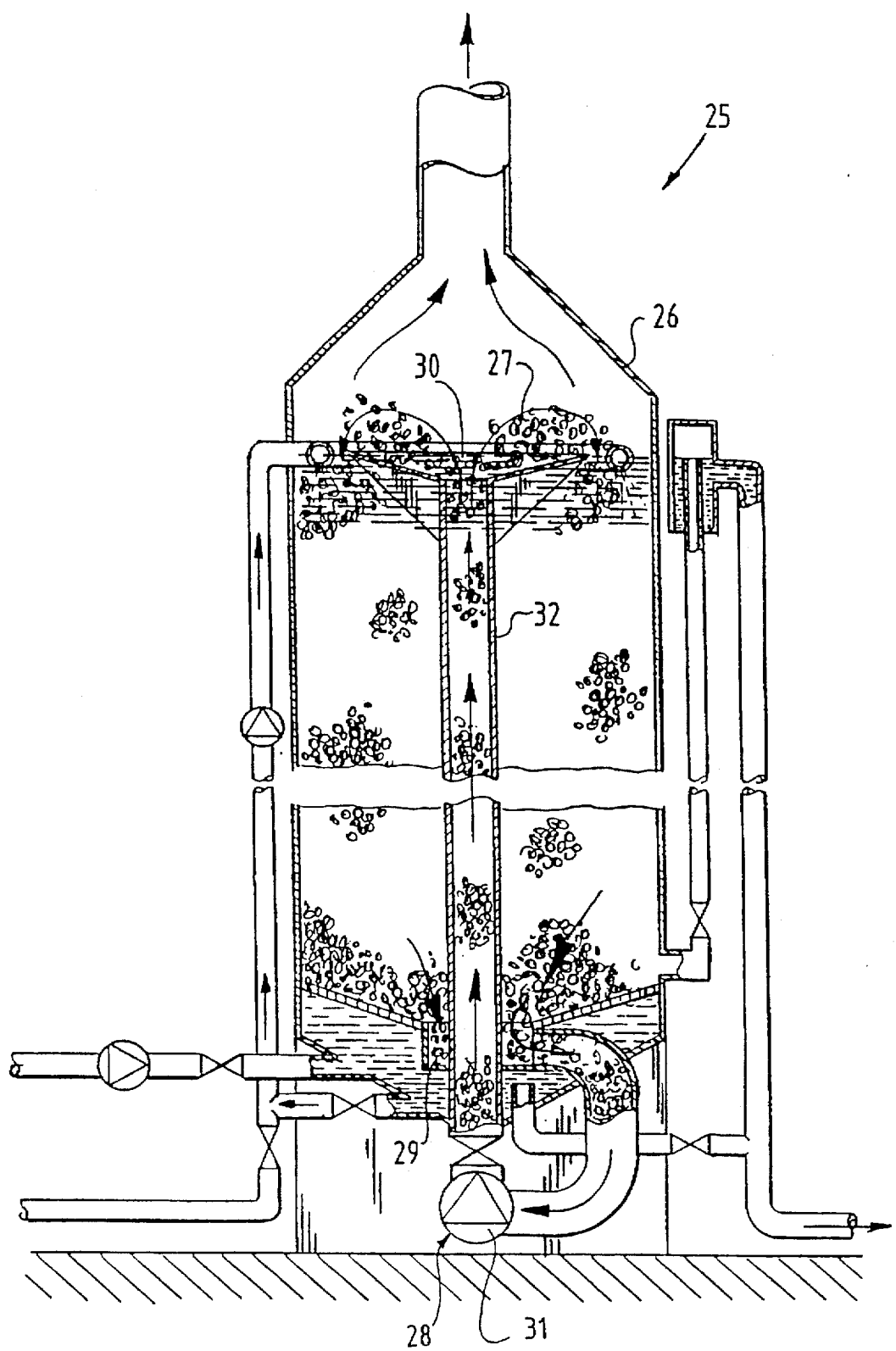
FIG. 3 shows a slightly different embodiment during regeneration.

The apparatus 25 shown in FIG. 3 largely corresponds with the apparatus 1 of FIGS. 1 and 2. The difference is that in the container 26 of the apparatus 25 are arranged carrier elements 27 which have a higher specific mass than water and which therefore do not float. The circulation means 28 are then embodied in the apparatus 25 such that the pump 31 thereof has an inlet 29 situated in the bottom of container 26 and an outlet 30 situated in the top of container 26.

The operation of the apparatus 25 in purifying air is identical to that of the apparatus 1 as described with reference to FIG. 1 and will therefore not be further elucidated here.

In the regeneration of the carrier elements 27 the pump 31 of the circulation means 28 generates in the central duct 32 a flow of carrier elements 27 taken up in water, so that the water with carrier elements is released at the top of container 26. The carrier elements 27 are then deposited on the top side of the bed of the underlying carrier elements.

Compared with this apparatus the apparatus 1 has the advantage that the dislodged sludge is released at the bottom of the container, while in apparatus 25 it is released at the top of the container and must sink downward with the carrier elements 27 before it can collect at the bottom of container 26. The danger of bridge formation of the carrier elements is moreover smaller in apparatus 1 than in apparatus 25.

Figure 4:
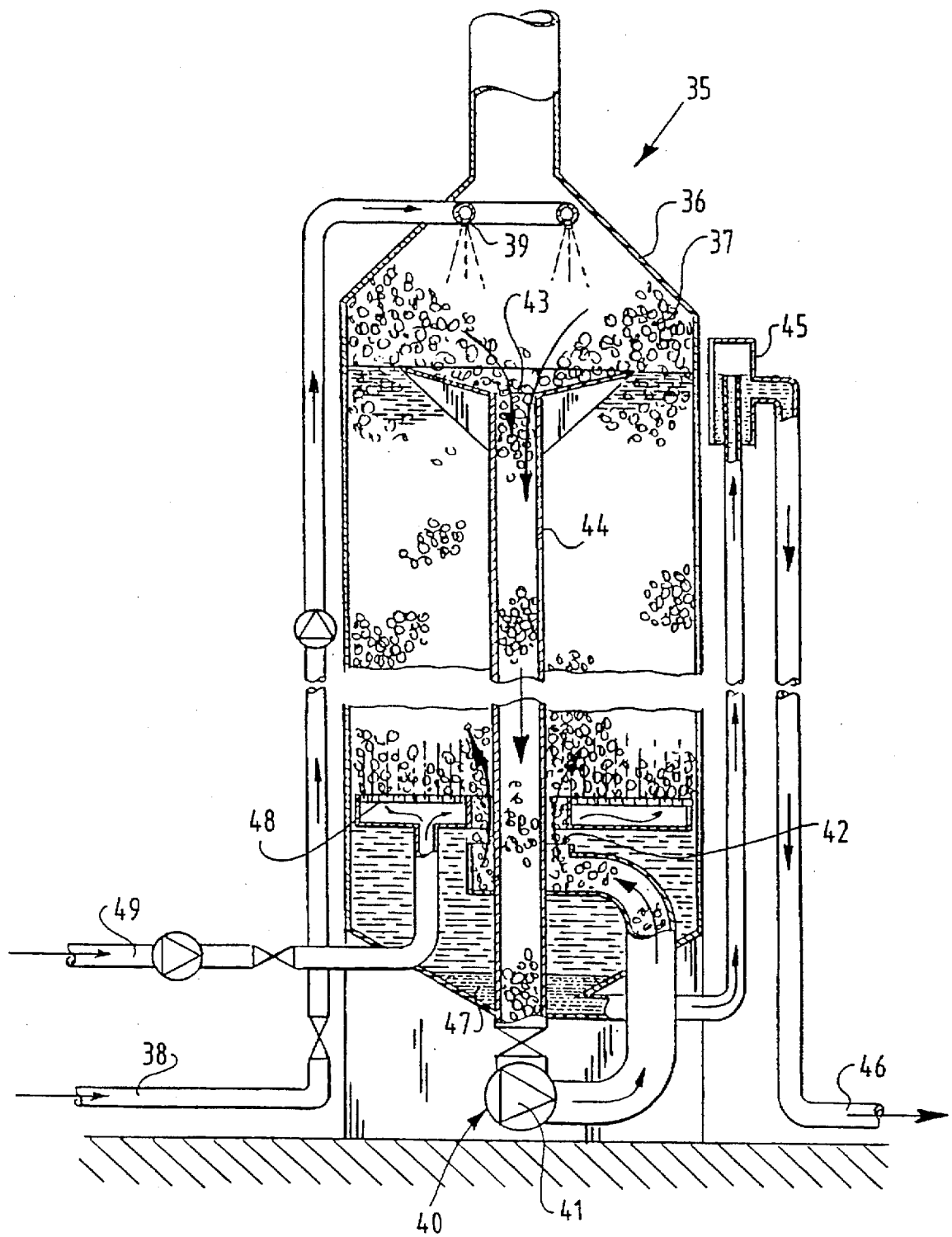
FIG. 4 shows an apparatus according to the invention for cleaning waste water.

The apparatus 35 shown in FIG. 4 is embodied for purifying waste water. In contrast with the apparatus 1 and 25 in which the regeneration of the carrier elements takes place periodically, regeneration in apparatus 35 takes place continuously.

The carrier elements 37 arranged in the container 36 of apparatus 35 have a lower specific mass than water and therefore float. Via the waste water feed 38 water contaminated with organic substances is fed into the top of the container 36. This water is carried onto the carrier elements 37 via outflow members 39. On the outlet side of container 37 is arranged an upward running bypass conduit which incorporates a level controller 45. This latter ensures that the free surface of the water is held just above the inlet 43 of the vertical duct 44. The excess water is drained via outlet conduit 46.

The supplied water 39 flows gradually downward through the bed of carrier elements 37 packed together in container 36. The organic waste substances in the water are herein absorbed by the micro-organisms which have formed on the carrier elements 37. The cleaned water leaves the apparatus on the underside of the container 36 via the said bypass conduit.

The circulation means 40 are, as noted, at least substantially in continuous operation. The pump 41 has an outlet 42 in the bottom of container 36 and an inlet 43 in the top of the container on the upper end of the duct 44. The carrier elements released at 42 move upward due to the upward force exerted by the water and these elements will nestle on the underside against the packed bed of carrier elements. The total upward force of the carrier elements 37 situated in the water is so great that a quantity of the carrier elements is lifted above the free water surface. These carrier elements are drawn via inlet 43 into the flow generated by pump 41. These elements have been in the packed bed longest and thus carry the largest amount of sludge. Due to the movement through duct 44 and pump 41 the sludge collected on the carrier elements is released therefrom. The dislodged sludge leaves the pump outlet at 42 and can settle at the bottom of the container. The settled sludge 47 is discharged via the outlet conduit 46.

The apparatus 35 is further provided with an aeration 48. Air supplied via a conduit 49 is blown in under the bed of carrier elements and ensures proper functioning of the micro-organisms.

Figure 5:
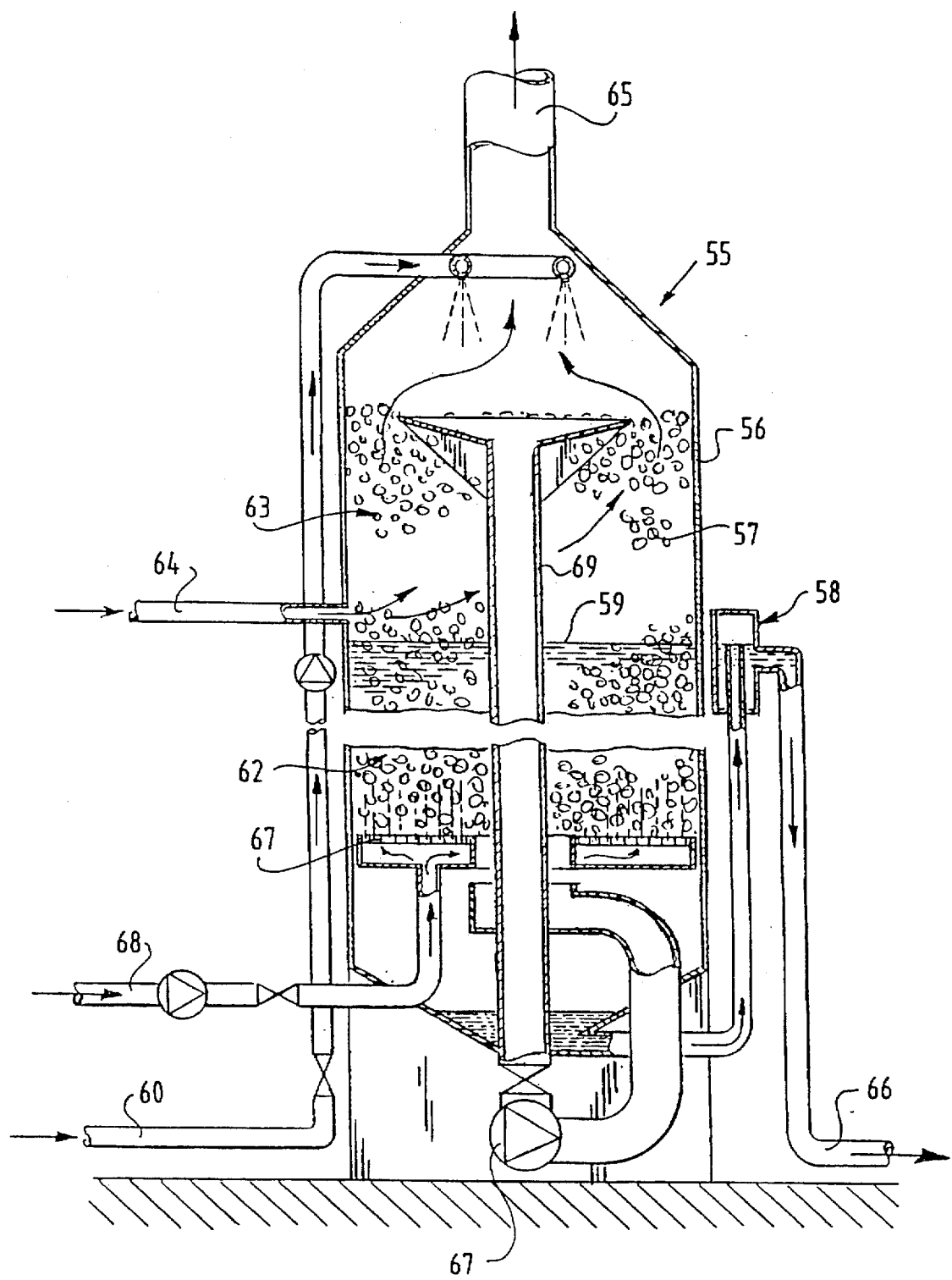
FIG. 5 shows an apparatus according to the invention for simultaneously cleaning waste water and waste air.

The embodiment of FIG. 5 is embodied such that waste water and waste air can be cleaned simultaneously. The regeneration of the carrier elements 56 arranged in the container 56 of apparatus 55 again takes place periodically.

The waste water for cleaning is supplied via the water feed 60 and flows via the outflow members 61 at the top of container 56 onto the bed of carrier elements 57. The apparatus 55 is provided with level control means 58 which maintain the free surface 59 of the water at an intermediate level in the container 56.

In the upper part 63 of container 56, which is the part above the free surface 59, waste air is fed through which is supplied via the waste air feed 64 which debouches into the container 56 close to the intermediate level of the water surface 59.

The waste air is thus cleaned in this upper part 63 by the action of the micro-organisms situated on the carrier elements 57. The cleaned air leaves container 56 at the air outlet 65 at the top of the container.

The waste water supplied via pipe 60 and flowing out into the container at the outflow apertures 61 gradually has the organic waste materials removed in the upper part 63, but for the greater part in the lower part 62 under the water surface 59.

In order also to create good conditions for the micro-organisms in the lower part 62 an aeration 67 is arranged under the bed of carrier elements 57 with which air supplied via air line 68 is blown in. The air supplied via air line 68 can be waste air.

The waste water flows gradually downward through the container and leaves container 56 at the bottom and, together with any collected sludge, is drained via the water outlet 66.

For regeneration of carrier elements 57 the air feed 64 and the air line 68 are closed. The level controller 58 is closed off or alternatively adjusted to a higher level. As much water is admitted into container 56 that the water level comes to lie above the pump inlet at the upper end of the vertical duct 69. Recirculation then takes place further in the manner as discussed with reference to FIG. 4.

Figure 6:
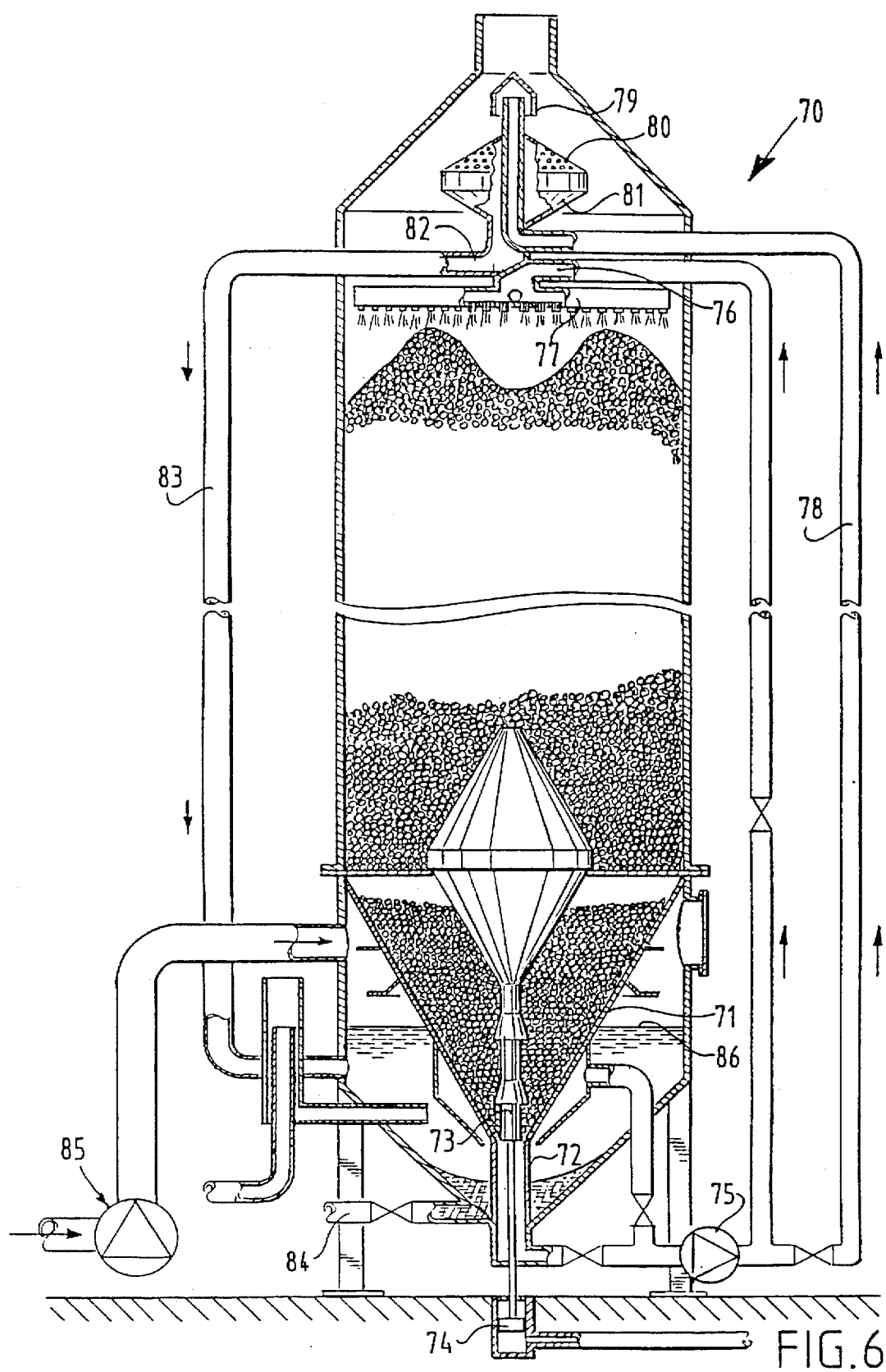
FIG. 6 shows another embodiment of an apparatus according to the invention for cleaning air.

The apparatus 70 shown in FIG. 6 is embodied for cleaning waste air. At the bottom of the container is arranged a conical bottom part which is permeable to air and water. Using air pump 85 the waste air is pumped into the bottom of the container and flows gradually upward between the carrier elements heaped in the container. A pump 75 pumps water upward via conduit 76 to the spray arms 77, where this water is sprayed uniformly over the packed bed of carrier elements. This water is once again collected in the bottom of the container and can be transported upward again for sprinkling over the carrier elements.

After a period of time so much sludge has formed on the carrier elements that these must be cleaned. To this end a cylinder 74 is set into operation which moves upward a shut-off valve element 73 in the bottom of the cone 71. The passage from the lower end of cone 71 to the pipe 72 connected thereunder is hereby opened. This pipe 72 is connected to the inlet of pump 75. By reversing valves in suitable manner the carrier elements can thus be transported upward with transport water via the pump 75 through pipe 78 to the top of the container. The pump outlet 79 arranged in this embodiment above a guide surface 80 which is provided with apertures which in this case are slot-shaped. The carrier elements drop onto the guide surface 80 which has a form sloping toward an end edge so that the carrier elements slide or roll downward along the guide surface and fall off the end edge of the surface 80 into the container onto the already present carrier elements. The water transported upward with the carrier elements which contains the major part of the sludge originally adhering to the carrier elements likewise flows onto the guide surface 80 but flows through the apertures therein into the water receiving element 81. This latter is connected via the connection 82 to the pipe 83 which runs to the sediment outlet. The dislodged sludge settles in the bottom of the container and can be drained periodically via the sediment outlet 84. A separate settler can of course also be used instead of a settler at the bottom of the reservoir. Using a suitable overflow construction the water is kept at the indicated level 86.

Figure 7:
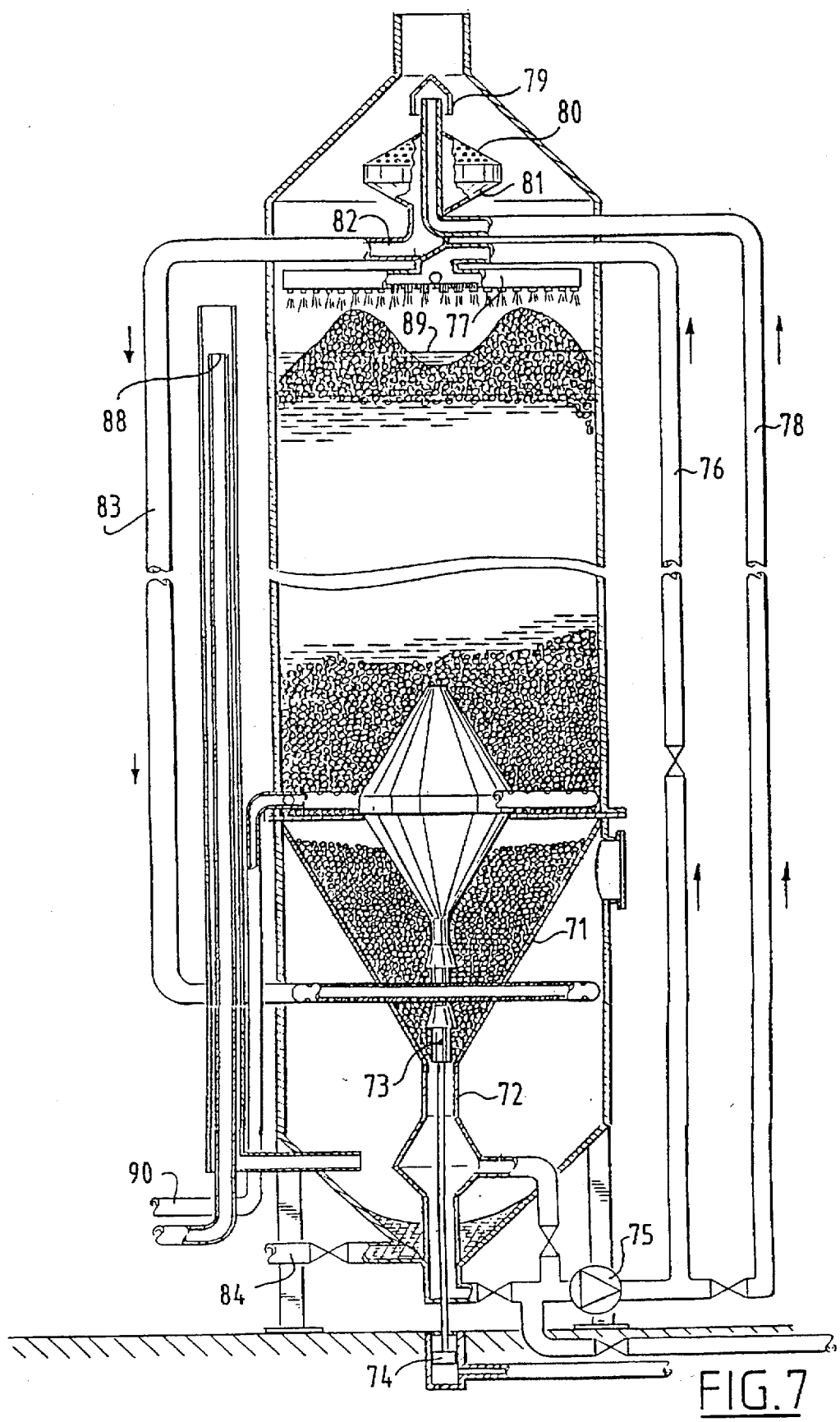
FIG. 7 shows an apparatus corresponding with FIG. 6 for cleaning waste water.

The apparatus of FIG. 7 is largely identical to that of FIG. 6. Corresponding components are therefore designated with the same reference numerals. The most important difference is that the overflow construction 88 in the embodiment of FIG. 7 is embodied such that a water level 89 is maintained in the container. Further, water in the bottom of the container is drawn out in similar manner using pump 75 and via the pipe 76 fed back again into the top of the container by means of the spray arms 77. During the gradual flow of the waste water downward from the top of the container the cleaning action is performed thereon by the micro-organisms. When after a period of time the water is sufficiently purified it can be drained or a part of the water can be drained periodically and supplemented with dirty water.

For good operation of the micro-organisms, which preferably have an aerobic action, air is supplied into the bottom of the container which is released at the top of the container.

Removal of the sludge from the carrier elements takes place in the same manner as described with reference to FIG. 6.

The specific weight of the carrier elements as applied in the apparatus of FIG. 6 is not of decisive importance. Carrier elements can be used which are lighter than water as well as those which are heavier than water.

In the apparatus of FIG. 7 carrier elements must be used which are heavier than water.

Figure 8:
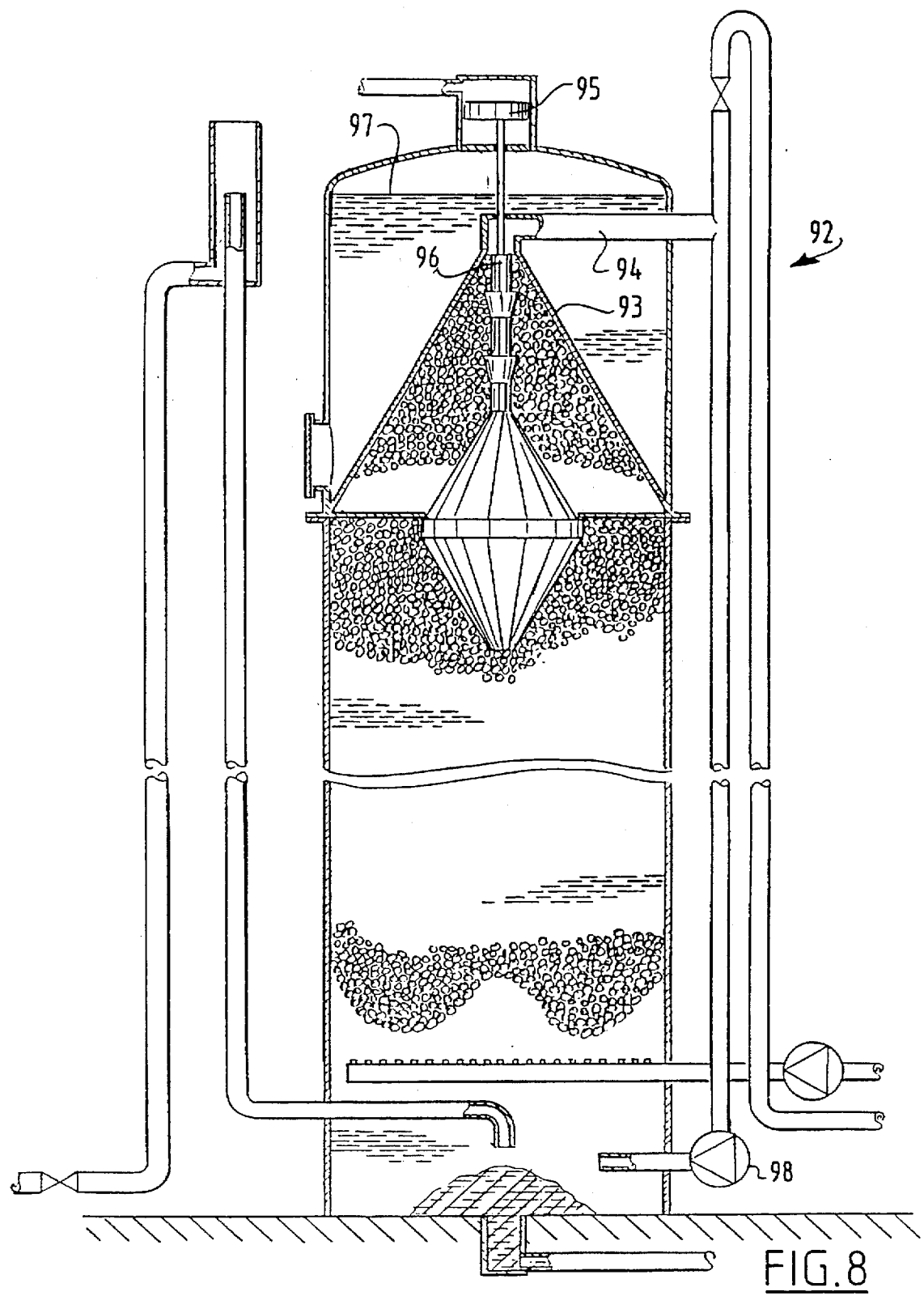
FIG. 8 shows a variant of the apparatus of FIG. 7.

The apparatus of FIG. 8 is a variant of that of FIG. 7 for the use of carrier elements which are lighter than water. In this apparatus 92 the collecting cone 93 for the carrier elements is arranged in the top of the container. The carrier elements are pushed upward into the funnel 93 by the pushing force of the carrier elements situated thereunder. As soon as shut-off valve 96 is opened using cylinder 95 the carrier elements move into the pipe 94. When the pump 98 is switched on simultaneously there results in pipe 94 a downward water flow in which the carrier elements are entrained. This water is drained from the pump outlet into the bottom of the container together with the carrier elements. The carrier elements float upward against the underside of the carrier elements already present in the container and the dislodged sludge can settle in the bottom of the container.

In this embodiment the water level is held by a suitable overflow construction at the level indicated by 97.

The water drainage of the discussed apparatus can be connected in each case to an additional settler in which the sludge discharged with the cleaned water can settle.

If carrier elements with a very low specific mass could be used, it is also possible in principle to have a continuously operating combined water/air cleaning apparatus. The air is then guided through the carrier elements which are pushed up above the free water surface by the upward force. Whether a combined water/air cleaning apparatus can be applied depends of course on the respective quantities of air and waste water for cleaning.

It will be apparent from the above that the invention can be applied in many different ways. The invention is not limited to the embodiments shown. Many variants are possible. It will thus be apparent to a skilled person that an apparatus according to the invention can be realized which is used alternately for cleaning water and air. Such an apparatus can for instance operate as air cleaner during the day while the waste water released during the day is collected and cleaned at night.

All these alternatives are deemed to be included within the scope of protection of the annexed claims.

I claim:

1. Apparatus for cleaning organic waste material from waste fluid, comprising a container at least partially filled with carrier elements, a waste fluid feed debouching into the container close to a vertical end, a fluid outlet connected to the container close to the opposite vertical end, carrier circulation means comprising a pump for pumping round water with carrier elements taken up therein, provided with a pump inlet and outlet respectively close to opposite vertical ends of the container, a sediment drain at the bottom of the container and control means for periodically switching on the carrier circulation means, wherein the waste fluid comprises air, a water sprinkling device is arranged in the top of the container for sprinkling water on the carrier elements and wherein the carrier circulation means comprise water transporting means for filling with water and emptying the container.

2. Apparatus as claimed in claim 1, wherein the pump outlet debouches in the top of the container above a guide surface provided with apertures, below which is arranged a water collecting element connected to the sediment drain.

3. Apparatus as claimed in claim 2, wherein the guide surface takes a form sloping toward an end edge.

4. Apparatus as claimed in claim 2, wherein the carrier elements have a specific mass lower than that of water and the pump inlet debouches in the top of the container and the pump outlet in the bottom of the container.

5. Apparatus as claimed in claim 2, wherein the carrier elements have a size and the container contains a quantity of carrier elements such that the carrier elements form a packed bed in the container.

6. Apparatus as claimed in claim 2, wherein the pump is a centrifugal pump with retracted impeller.

7. Apparatus as claimed in claim 1, wherein the carrier elements have a specific mass lower than that of water and the pump inlet debouches in the top of the container and the pump outlet in the bottom of the container.

8. Apparatus as claimed in claim 7, wherein the pump is a centrifugal pump with retracted impeller.

9. Apparatus as claimed in claim 1, wherein the carrier elements have a size and the container contains a quantity of carrier elements such that the carrier elements form a packed bed in the container.

10. Apparatus as claimed in claim 1, wherein the pump is a centrifugal pump with retracted impeller.

11. Apparatus for cleaning organic waste material from waste air and waste water, comprising a container at least partially filled with carrier elements, a waste water feed debauching into the top of the container, a water outlet connected to the bottom of the container, level control means for defining an intermediate level in the container and maintaining a free water surface at said intermediate level, a waste air feed debouching close to the intermediate level in the container, an air outlet in the top of the container, carrier circulation means comprising a pump for pumping round water with carrier elements taken up therein, provided with a pump inlet and outlet respectively at the top and at the bottom of the container, and control means for periodically switching on the carrier circulation means.

12. Apparatus as claimed in claim 11, wherein the carrier elements have a size and the container contains a quantity of carrier elements such that the carrier elements form a packed bed in the container.

13. Apparatus as claimed in claim 11, wherein the pump is a centrifugal pump with retracted impeller.

* * * * *